(12) United States Patent  
Fisher et al.

(10) Patent No.: US 9,093,073 B1
(45) Date of Patent: Jul. 28, 2015

(54) AUTOMATIC SPEECH RECOGNITION TAGGING

(75) Inventors: Aaron Scott Fisher, Omaha, NE (US); Prashanta Pradhan, Omaha, NE (US)

(73) Assignee: West Corporation, Omaha, NE (US)

(*) Notice: Subject to any disclaimer, the term of this patent is extended or adjusted under 35 U.S.C. 154(b) by 1585 days.

(21) Appl. No.: 11/673,665

(22) Filed: Feb. 12, 2007

(51) Int. Cl.
*G10L 15/00* (2013.01)
*G10L 15/26* (2006.01)
*G10L 15/04* (2013.01)

(52) U.S. Cl.
CPC .................................. *G10L 15/26* (2013.01)

(58) Field of Classification Search
USPC .......................... 704/257, E15.018–9, 24, 26
See application file for complete search history.

(56) References Cited

U.S. PATENT DOCUMENTS

| | | | | |
|---|---|---|---|---|
| 6,104,998 | A * | 8/2000 | Galand et al. | 704/500 |
| 6,275,800 | B1 * | 8/2001 | Chevalier et al. | 704/246 |
| 6,631,346 | B1 * | 10/2003 | Karaorman et al. | 704/9 |
| 6,983,247 | B2 * | 1/2006 | Ringger et al. | 704/251 |
| 7,610,191 | B2 * | 10/2009 | Gao et al. | 704/9 |
| 2002/0069059 | A1 * | 6/2002 | Smith | 704/257 |
| 2003/0216919 | A1 * | 11/2003 | Roushar | 704/260 |
| 2004/0044516 | A1 * | 3/2004 | Kennewick et al. | 704/5 |
| 2004/0078190 | A1 * | 4/2004 | Fass et al. | 704/7 |
| 2004/0148170 | A1 * | 7/2004 | Acero et al. | 704/257 |
| 2005/0055209 | A1 * | 3/2005 | Epstein et al. | 704/255 |
| 2005/0080613 | A1 * | 4/2005 | Colledge et al. | 704/9 |
| 2005/0278368 | A1 * | 12/2005 | Benedikt et al. | 707/101 |

* cited by examiner

*Primary Examiner* — Jesse Pullias

(57) ABSTRACT

A method, a computer readable medium and a system for tagging automatic speech recognition that comprises, collecting an utterance, analyzing the utterance, and assigning a tag to the analyzed utterance.

15 Claims, 8 Drawing Sheets

AUTOMATIC SPEECH RECOGNITION TAGGING

CROSS REFERENCE TO RELATED APPLICATIONS

The present patent application is also related to commonly assigned U.S. patent application Ser. No. 11/673,667 entitled AUTOMATIC SPEECH RECOGNITION REPORTING, Ser. No. 11/673,663 entitled AUTOMATIC SPEECH RECOGNITION TUNING MANAGEMENT, filed on even date herewith, the entire contents of each of which are incorporated by reference herein.

FIELD OF THE INVENTION

The embodiment of the disclosure is generally related to enabling an Automatic Speech Recognition (ASR) system to recognize a multitude of spoken strings of words as a single meaning within a natural language application and more specifically, to allow collaborative creation of a natural language application. ASR natural language applications represent a computer system architecture allowing a human end user to interact with a computer by issuing voice commands.

Therefore, what is needed is an ability to overcome these problems and limitations to automatically manage automatic speech recognition tagging.

BACKGROUND OF THE INVENTION

Currently, the creation of an ASR natural language application requires significant effort from subject matter experts and grammar developers primarily related to the mapping of potential spoken strings of words (utterances) to specific meanings (semantics). This mapping is referred to as the Tagging process. The Tagging process requires review of all possible combinations of utterances and assignment to a specific semantic upon which a natural language application can react. The sample size of potential utterances that must be tagged can be too large for a single subject matter expert or grammar developer (Taggers) to process. Limiting the Tagging process to a single Tagger can lead to excessive time consumed in the Tagging process and/or an insufficient mapping between potential utterances and their associated semantic.

Therefore, what is needed is collaborative solution that allows multiple subject matter experts and grammar developers to not only accelerate the Tagging process but to also to improve the accuracy of tagged utterances.

SUMMARY OF THE INVENTION

The embodiment of the disclosure provides a computer system that facilitates collaborative effort in the Tagging process supporting an ASR natural language application. The success of a natural language application is tied to a system's ability to understand a large list of transcribed utterances or sentences. A system must apply a complex set of rules referred to as semantic interpretation grammar. This grammar is based on a corpus which is tagged (a corpus is a collection of recorded utterances used for linguistic analysis). Therefore, before the grammar can be developed each line in the corpus must be tagged. The Tagging process is performed by a subject matter expert (SME) who indicates the specific meaning of a sentence. For example, the sentence "I just received my bill today" could indicate "I want to pay my bill" in a bill payment context. In this example, the sentence would be tagged as "PAYBILL".

The embodiment of the disclosure expedites and simplifies this process by providing a collaborative environment for multiple SME's to Tag a potentially large number of sentences. The tagging process is vital to the success of a natural language application, however, it is a very lengthy and tedious process.

The embodiment of the disclosure provides a flexible system, implemented in software, which integrates with a transcription system for capturing the utterances/sentences to be tagged by an SME. In addition, said system provides a graphical user interface (GUI) supporting SME interaction with the system. Said system also stores all sentence and tag associations in a relational database.

In one embodiment of the disclosure, a method for tagging automatic speech recognition that comprises, collecting an utterance, analyzing the utterance, and assigning a tag to the analyzed utterance.

In another one embodiment of the disclosure, a computer readable medium that comprising instructions for recording an utterance, transcribing the utterance, evaluating the transcribed utterance, predicting a potential tag of the evaluated utterance, and assigning a tag to the evaluated utterance.

In yet a further embodiment of the disclosure, a system for tagging automatic speech recognition comprises, a memory, a processor communicably coupled to the memory, wherein the processor, receives an utterance, transcribes the received utterance, analyses the transcribed utterance, groups similarly analyzed utterance, and discards replicate groupings of similarly analyzed utterances.

DETAILED DESCRIPTION OF THE INVENTION

Figure 1:
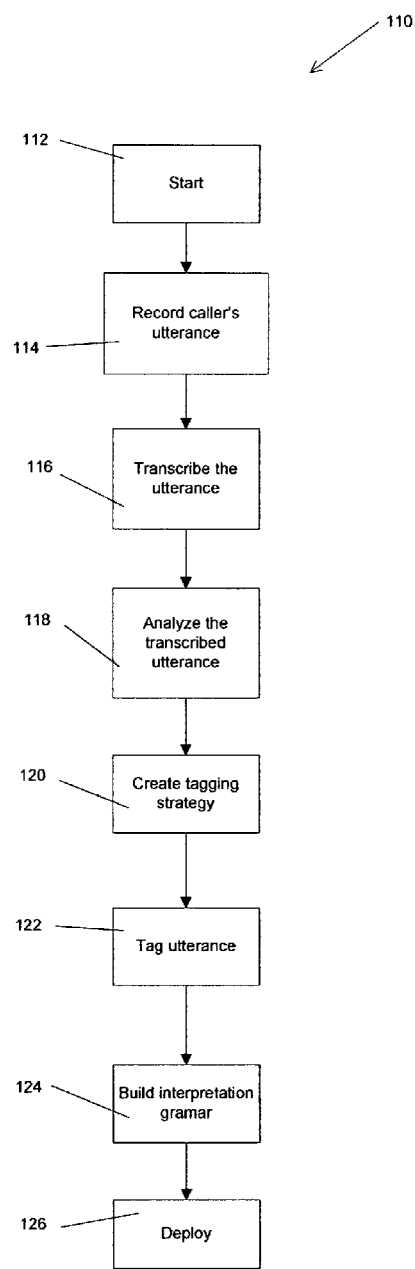
FIG. 1 represents a first overview of tagging automatic speech recognition in accordance with an embodiment of the disclosure.

Referring now to FIG. 1, a first overview of tagging automatic speech recognition 110 is depicted and comprises a number of blocks or modules that are software, hardware, or firmware, and/or the combination of software, hardware, and/ or firmware. In the first overview the system is started 112, and records 114 a callers utterance, transcribes 116 the utterance and analyzes 118 the transcribed utterance. A tagging strategy is created 120 and the utterance is tagged 122, then an semantic interpretation grammar is created 124 and the system is deployed 126

Figure 2:
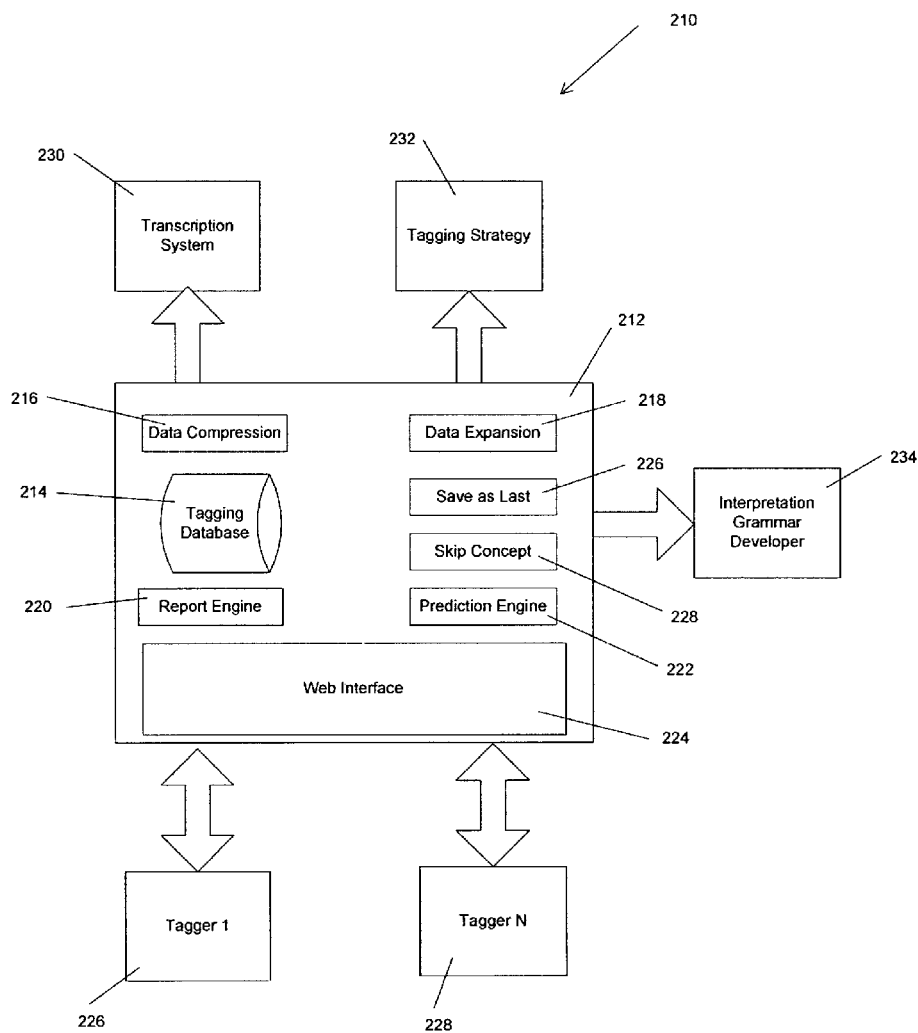
FIG. 2 represents a first system of tagging automatic speech recognition in accordance with an embodiment of the disclosure.

Referring now to FIG. 2, a second overview of tagging automatic speech recognition 210 is depicted and comprises a number of blocks or modules that are software, hardware, or firmware, and/or the combination of software, hardware, and/or firmware. The second overview depicts a tagging server 212 which has a tagging database 214. The tagging server compresses 216 data and expands 218 data, has a report engine 220 a prediction engine 222 and a web interface 224. The web interface is communicably coupled to tagging computers 226 and 228. A transcription system 230 and tagging strategy 232 provide inputs to the tagging server. The output of the tagging server is a grammar developer 234.

Figure 3:
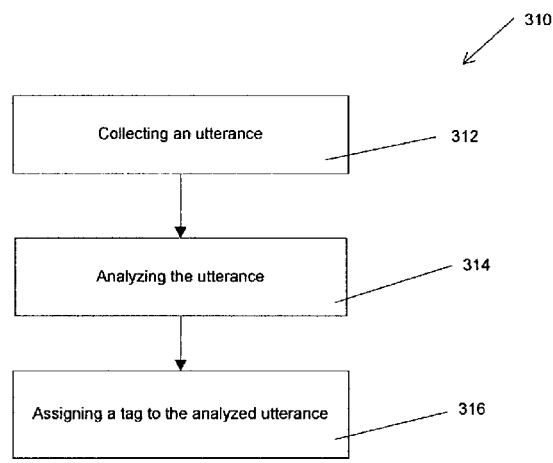
FIG. 3 represents a first method of tagging automatic speech recognition in accordance with an embodiment of the disclosure.

Referring now to FIG. 3, a first method of tagging automatic speech recognition 310 is depicted and comprises a number of blocks or modules that are software, hardware, or firmware, and/or the combination of software, hardware, and/or firmware. A method for tagging automatic speech recognition that comprises, collecting 312 an utterance, analyzing 314 the utterance, and assigning 316 a tag to the analyzed utterance. The transfer of information occurs via at least one of: a wireless protocol, a wired protocol and a combination of the wireless protocol and the wired protocol.

Figure 4:
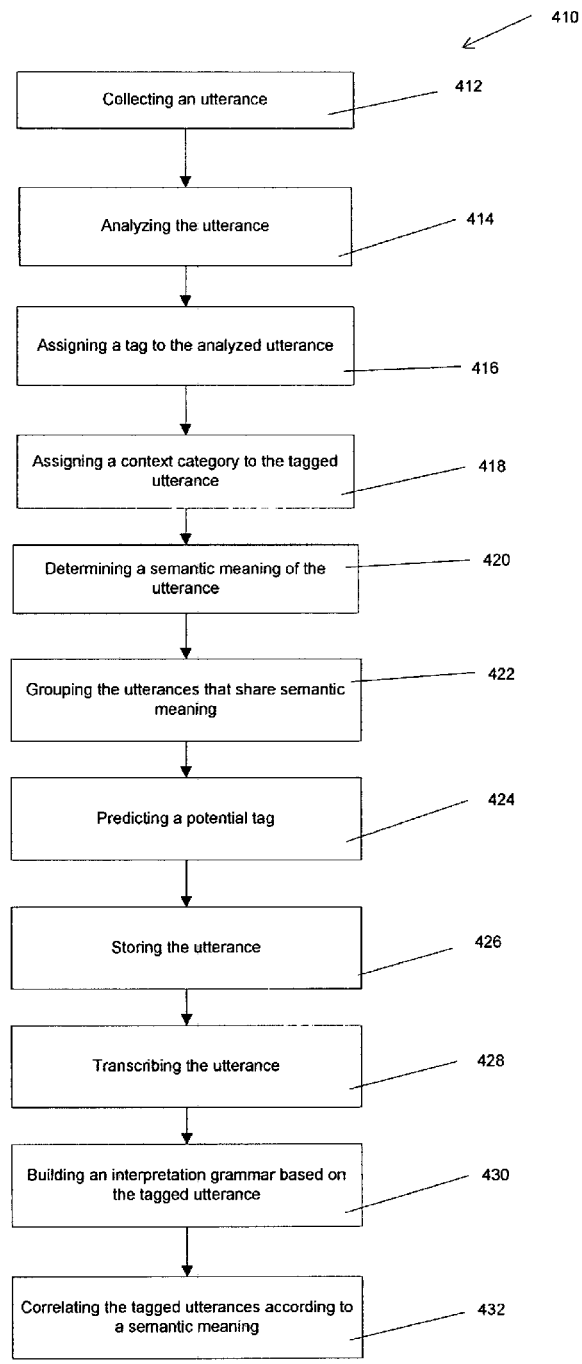
FIG. 4 represents a second method of tagging automatic speech recognition in accordance with an embodiment of the disclosure.

Referring now to FIG. 4, a second method of tagging automatic speech recognition 410 is depicted and comprises a number of blocks or modules that are software, hardware, or firmware, and/or the combination of software, hardware, and/or firmware. A method for tagging automatic speech recognition that comprises, collecting 412 an utterance, analyzing 414 the utterance, and assigning 416 a tag to the analyzed utterance. The method may also comprise assigning 418 a context category to the tagged utterance, determining 420 a semantic meaning of the utterance, grouping 422 utterances that share semantic meanings and predicting 424 a potential tag. The method may additionally comprise storing 426 the utterance, transcribing 428 the utterance, building 430 an semantic interpretation grammar based on the tagged utterance and correlating 432 tagged utterances according to a semantic meaning wherein analysis of the utterance occurs in parallel to assignment of the tag. The transfer of information occurs via at least one of: a wireless protocol, a wired protocol and a combination of the wireless protocol and the wired protocol.

Figure 5:
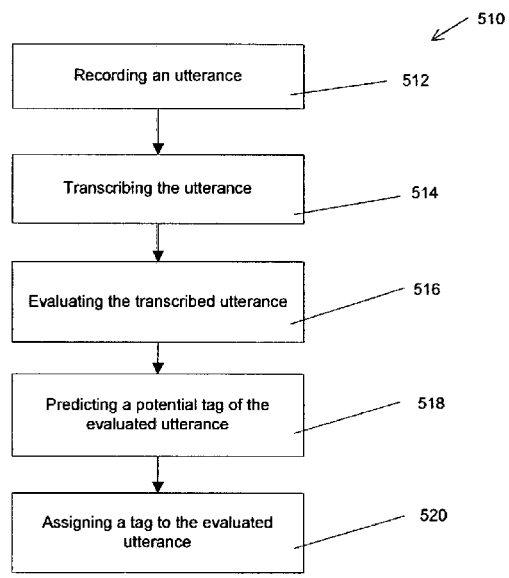
FIG. 5 represents a first computer readable medium in accordance with an embodiment of the disclosure.

Referring now to FIG. 5, a first software flow block 510 of tagging automatic speech recognition is depicted. A computer readable medium that comprises instructions for, recording 512 an utterance, transcribing 514 the utterance, evaluating 516 the transcribed utterance, predicting 518 a potential tag of the evaluated utterance, and assigning 520 a tag to the evaluated utterance. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 6:
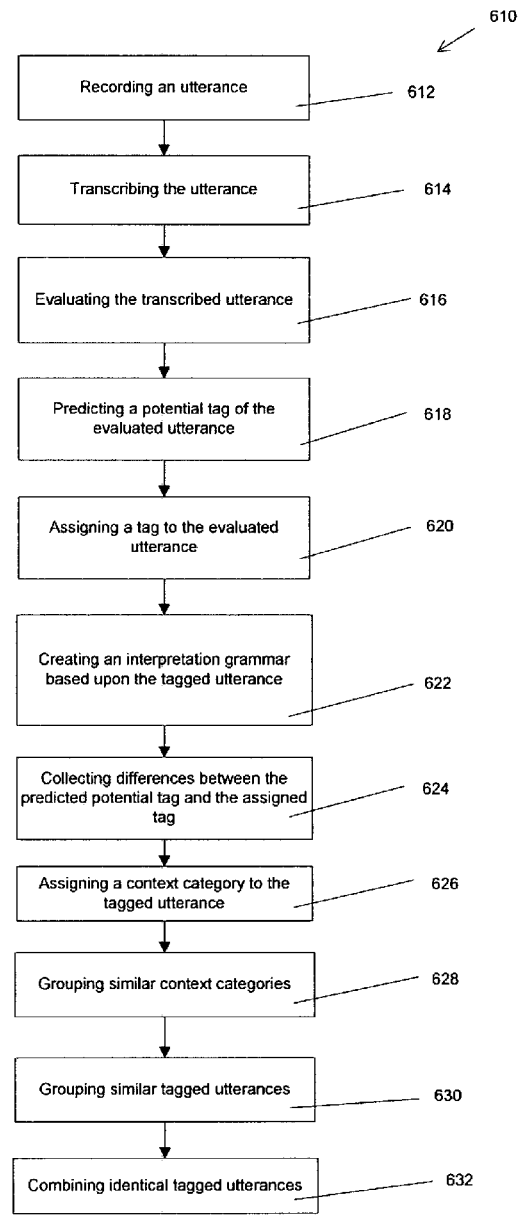
FIG. 6 represents a second computer readable medium in accordance with an embodiment of the disclosure.

Referring now to FIG. 6, a second software flow block 610 of tagging automatic speech recognition is depicted. A computer readable medium that comprises instructions for, recording 612 an utterance, transcribing 614 the utterance, evaluating 616 the transcribed utterance, predicting 618 a potential tag of the evaluated utterance, and assigning 620 a tag to the evaluated utterance. The computer readable medium may comprise instructions for, creating 622 an semantic interpretation grammar based upon the tagged utterance, collecting 624 differences between the predicted potential tag and the assigned tag, assigning 626 a context category to the tagged utterance, grouping 628 similar context categories, grouping 630 similar tagged utterances and combining 632 identical tag assignments. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 7:
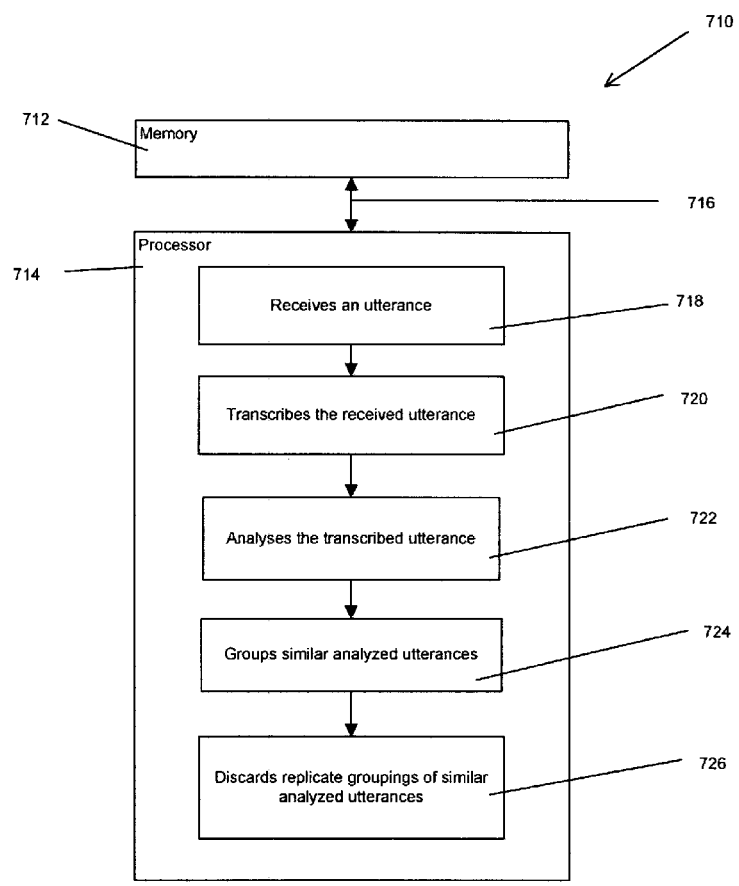
FIG. 7 represents a second system of tagging automatic speech recognition in accordance with an embodiment of the disclosure.

Referring now to FIG. 7, a second system 710 of tagging automatic speech recognition is depicted. A system for tagging automatic speech recognition comprises, a memory 712, a processor 714 communicably coupled 716 to the memory, wherein the processor, receives 718 an utterance, transcribes 720 the received utterance, analyses 722 the transcribed utterance, groups 724 similarly analyzed utterance, and discards 726 replicate groupings of similarly analyzed utterances. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Figure 8:
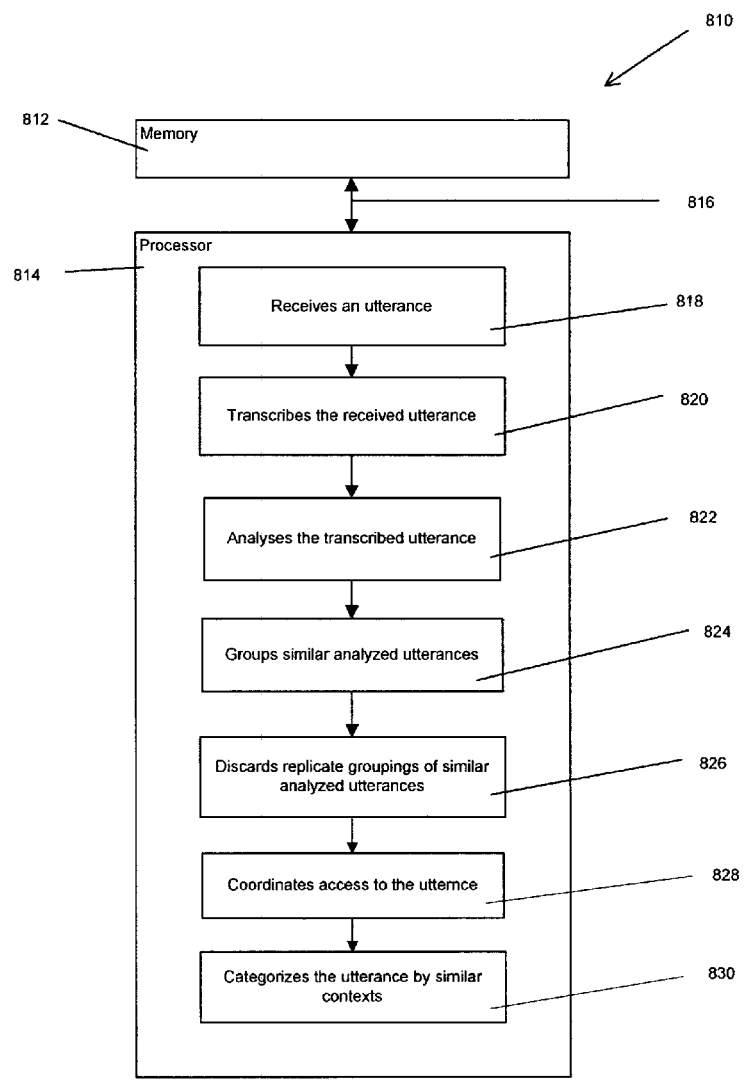
FIG. 8 represents a third system of tagging automatic speech recognition in accordance with an embodiment of the disclosure.

Referring now to FIG. 8, a third system 810 of tagging automatic speech recognition is depicted. A system for tagging automatic speech recognition comprises, a memory 812 and a processor 814 communicably coupled 816 to the memory, wherein the processor, receives 818 an utterance, transcribes 820 the received utterance, analyses 822 the transcribed utterance, groups 824 similarly analyzed utterance, and discards 826 replicate groupings of similarly analyzed utterances. The system may processor may also coordinate 828 access to the utterance and categorize 830 the utterance by similar contexts. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Systems, methods, devices and computer readable media have been shown and/or described in the above embodiments for tagging automatic speech recognition. Although the above descriptions set forth preferred embodiments, it will be understood that there is no intent to limit the invention by such disclosure, but rather, it is intended to cover all modifications and alternate implementations falling within the spirit and scope of the invention. For example, the embodiment of the disclosure should not be limited to tagging automatic speech recognition. Lastly, the embodiments are intended to cover capabilities and concepts whether they be via a loosely coupled set of components or they be converged into one or more integrated components, devices, circuits, and/or software programs.

What is claimed is:
1. A computer implemented method, comprising:
 collecting an utterance;
 analyzing the utterance;
 creating a tagging strategy;
 providing the tagging strategy to a tagging server;
 predicting a potential tag for the utterance;
 assigning a tag to the analyzed utterance;
 assigning a context category to the tagged utterance; and
 combining identical tag assignments, wherein the utterance is compressed and expanded by a tagging server.

2. The computer implemented method of claim 1, further comprising:

determining a semantic meaning of the utterance.

3. The computer implemented method of claim 2, further comprising:

grouping utterances that share semantic meanings.

4. The computer implemented method of claim 1, further comprising:

storing the utterance.

5. The computer implemented method of claim 1, further comprising:

transcribing the utterance.

6. The computer implemented method of claim 1, further comprising:

building a semantic interpretation grammar based on the tagged utterance.

7. The computer implemented method of claim 1, further comprising:

correlating tagged utterances according to a semantic meaning.

8. The computer implemented method of claim 1, wherein the analysis of the utterance occurs in parallel to the assignment of the tag.

9. A non-transitory computer readable medium comprising instructions that, when executed by a processor, are configured to cause the processor to:

record an utterance;
transcribe the utterance;
evaluate the transcribed utterance;
create a tagging strategy;
provide the tagging strategy to a tagging server;
predict a potential tag of the evaluated utterance;
assign a tag to the evaluated utterance;
assign a context category to the tagged utterance; and
combine identical tag assignments,
wherein the utterance is compressed and expanded by a tagging server.

10. The computer readable medium of claim 9, wherein the instructions are further configured to cause the processor to:

create a semantic interpretation grammar based upon the tagged utterance.

11. The computer readable medium of claim 9, wherein the instructions are further configured to cause the processor to:

collect differences between the predicted potential tag and the assigned tag.

12. The computer readable medium of claim 9, wherein the instructions are further configured to cause the processor to:

group similar context categories.

13. The computer readable medium of claim 9, wherein the instructions are further configured to cause the processor to:

group similar tagged utterances.

14. A system, comprising:

a memory; and
a processor communicably coupled to the memory, wherein the processor is configured to:
receive an utterance;
transcribe the received utterance;
analyze the transcribed utterance;
create a tagging strategy;
provide the tagging strategy to a tagging server;
predict a potential tag of the utterance;
tag the transcribed utterance;
group similarly analyzed utterances;
combine identical tag assignments;
categorize the similarly analyzed utterances by similar contexts; and
discard replicate groupings of similarly analyzed utterances;
wherein the utterance is compressed and expanded by a tagging server.

15. The system of claim 14, wherein the processor is further configured to:

coordinate access to the utterance.

* * * * *